United States Patent [19]

Dunn et al.

[11] Patent Number: 5,822,413
[45] Date of Patent: Oct. 13, 1998

[54] FRAUD CONTROL SYSTEM FOR PROCESSING CALLS WITH AN AUTOMATIC NUMBER IDENTIFICATION FAILURE

[75] Inventors: Thomas A. Dunn, Edison; Howard J. Geiger, Colonia; Mark C. Pollman, Old Bridge, all of N.J.; Thomas C. Sharpe, Conyers, Ga.

[73] Assignee: AT&T Corp, Middletown, N.J.

[21] Appl. No.: 641,860

[22] Filed: May 2, 1996

[51] Int. Cl.[6] .................................................. H04M 15/00
[52] U.S. Cl. .......................... 379/114; 379/115; 379/118; 379/120; 379/127; 379/196
[58] Field of Search .......................... 379/114–115, 118, 379/120–121, 124, 126–127, 196–197, 111, 112, 188, 189

[56] References Cited

U.S. PATENT DOCUMENTS

| | | | |
|---|---|---|---|
| 5,222,120 | 6/1993 | McLeod et al. | 379/196 |
| 5,550,899 | 8/1996 | McLeod et al. | 379/67 |
| 5,586,175 | 12/1996 | Hogan et al. | 379/196 |

*Primary Examiner*—Curtis Kuntz
*Assistant Examiner*—Duc Nguyen

[57] ABSTRACT

A system for preventing fraudulent calling activity in a telecommunications network when an Automatic Number Identification failure (ANIF) occurs at a switch attempting to process a call within the network. When an ANIF occurs, an operator obtains information equivalent to an Automatic Number Identification (ANI) from the calling party and the system determines whether the call is of a type that would not have been restricted had the ANIF not occurred. If the call would not otherwise have been restricted had the ANIF not occurred, the system automatically assigns a blanket billing restriction to the call which only allows specific call types (such as what are deemed the safer alternate billing methods of collect or credit card) and blocks other restricted call types.

21 Claims, 1 Drawing Sheet

FRAUD CONTROL SYSTEM FOR PROCESSING CALLS WITH AN AUTOMATIC NUMBER IDENTIFICATION FAILURE

BACKGROUND OF THE INVENTION

1. Field of the Invention

The present invention relates generally to the field of telecommunications, and more particularly to a system for preventing fraudulent telephone calls in a telecommunications network when such calls arrive at an operating switch with an Automatic Number Identification failure (ANIF).

2. Description of the Related Art

Fraudulent telephone activity for domestic and international calls presents a significant and increasing problem to carriers of telecommunications networks, such as AT&T Corp.

Conventional telecommunications systems today, such as what is known as the public switched telephone network (PSTN), comprise several interdependent networks: the local or exchange area network, which is typically operated by a local telephone company or local exchange company (LEC); and the toll network, which is operated by a long distance or interexchange carrier (IXC), such as AT&T Corp.

In the conventional PSTN, a given telephone within a LEC network is capable of accessing the IXC network through known gateway switching equipment, such as AT&T's 4ESS™ and 5ESS™ toll switches and operator services position system (OSPS™) switch. Upon access to the IXC network, a toll call may be completed outside the LEC network.

Typically, when a toll call is initiated, the call is routed from the LEC network to IXC network. In accessing the IXC network, certain information is transmitted from the LEC network to the IXC gateway switching equipment. Included within this transmitted information is an Automatic Number Identification (ANI) for the particular call. The ANI is used for, among other things, billing purposes and frequently corresponds to the calling number (e.g., the telephone number of the subscriber placing the toll call). The ANI is typically provided by an ANI system, which is well known to those skilled in the art.

The ANI may be transmitted to the IXC gateway switching equipment via multifrequency pulsing over the talking path (inband signalling). Upon receipt of the transmitted information (including ANI), the IXC switching equipment performs an integrity check on the ANI to ascertain if that ANI is valid. If the ANI is valid, the call is processed as normal.

However, unscrupulous individuals intent on committing a fraudulent call have developed techniques for interrupting the ANI signal transmitted to the IXC switching equipment, thereby causing what is referred to as an ANI failure (ANIF). When an ANIF occurs, the call must be processed by an operator in order to obtain the proper ANI from the calling party. The caller communicates information equivalent to the ANI to the operator (customer-provided ANI), such as the calling party's telephone number or the telephone number associated with the telephone used by the calling party, and the operator manually inputs the customer-provided ANI into the IXC switching equipment.

The IXC switching equipment performs an initial screening to determine if the customer-provided ANI is potentially fraudulent. Based upon the information provided by the caller to the operator, the IXC switching equipment verifies that the actual calling path from which the call was routed corresponds to the calling path expected for a call having that particular ANI. This is accomplished by comparing the customer-provided ANI to a list of partial line numbers (NPA-NXX) served by the incoming trunk group to that switch. If the line number corresponding to the customer-provided ANI does not appear on the list, then the call is identified as potentially fraudulent and is denied. Alternatively, if the line number corresponding to the customer-provided ANI appears on the list, then the call will continue to be processed. This initial screening is limited, however, because the range of line numbers stored in the list for the particular IXC switching equipment is quite large. Therefore, so long as the caller provides information (customer-provided ANI) which corresponds to one of the line numbers stored in the IXC equipment, then the call will continue to be processed.

If the customer-provided ANI passes the initial screening performed by the IXC switching equipment, then the call is further processed via Original Line Screening (OLS). During OLS, the IXC switching equipment checks tables stored in its database for any billing and line class restrictions associated with the ANI provided by the caller. If the call satisfies the billing and line class restrictions, then the call is completed. Alternatively, if the call does not satisfy the billing and line class restrictions, then the call is identified as potentially fraudulent and is denied.

Additional security measures have been implemented by the IXC in an attempt to limit this type of fraudulent calling activity. These additional security measures, such as Network Access Interruption (NAI), include restriction tables associated with a given ANI and are also capable of monitoring calling patterns (i.e., number of calls and/or total cost of calls in a predetermined period for a given ANI) to predict whether a call is potentially fraudulent.

Through trial and error, however, an unscrupulous individual intent on committing a fraudulent call may locate an ANI having few, if any, restrictions so that OLS and/or NAI is unable to identify the call as potentially fraudulent. Therefore, the fraudulent caller can utilize the ANI to pass the initial screening, OLS and NAI. In such a case, the unauthorized call is allowed and will be billed to that ANI.

SUMMARY OF INVENTION

The above and other problems of the prior art are solved by the present invention which provides a system for preventing fraudulent calling activity in a telecommunications network when an ANIF occurs. According to the present invention, when an ANIF occurs, an operator obtains information equivalent to an ANI from the calling party (customer-provided ANI) and, based upon that obtained information, the system determines whether the call is of a type that would not have been restricted had the ANIF not occurred. If the call would not otherwise have been restricted had the ANIF not occurred, the system automatically assigns a blanket billing restriction to the call which only allows specific call types (such as what are deemed the safer alternate billing methods of collect or credit card) and blocks other restricted call types.

BRIEF DESCRIPTION OF THE DRAWINGS

The foregoing features and other aspects of the invention are explained in the following description taken in connection with the accompanying drawings wherein.

DESCRIPTION OF THE PREFERRED EMBODIMENTS

Figure 1:
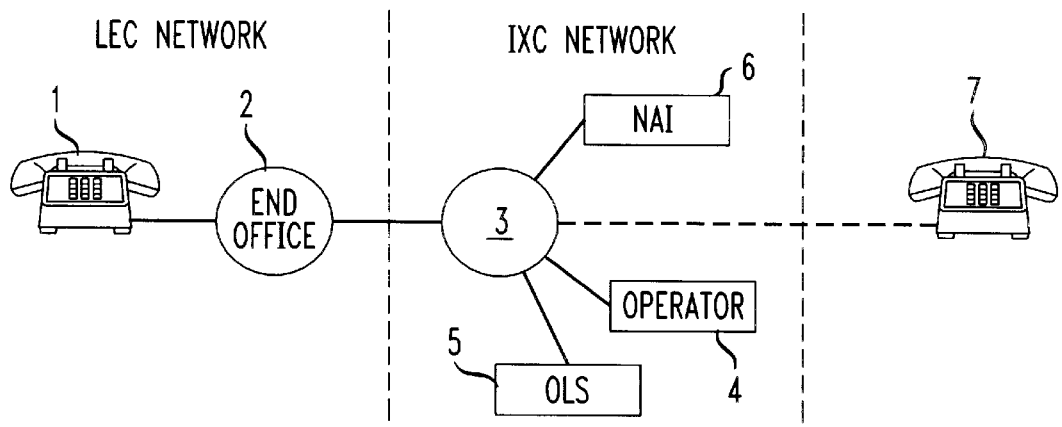
FIG. 1 is a schematic of a telecommunications network embodying the present invention.

The fraud control system of the present invention is designed to minimize fraudulent calling activity when an ANIF occurs. Referring to FIG. 1, when a toll call is initiated from telephone 1, the call is processed in the LEC network in a conventional manner. Before accessing the IXC network, the call is further processed in a conventional manner at a local switching office (end office) 2 in the LEC network which interfaces with the IXC network. By way of example, but without limitation, end office 2 may be a Class 5 end office such as a Step-by-Step (SXS) or 5 Cross-bar (5XB).

Figure 2:
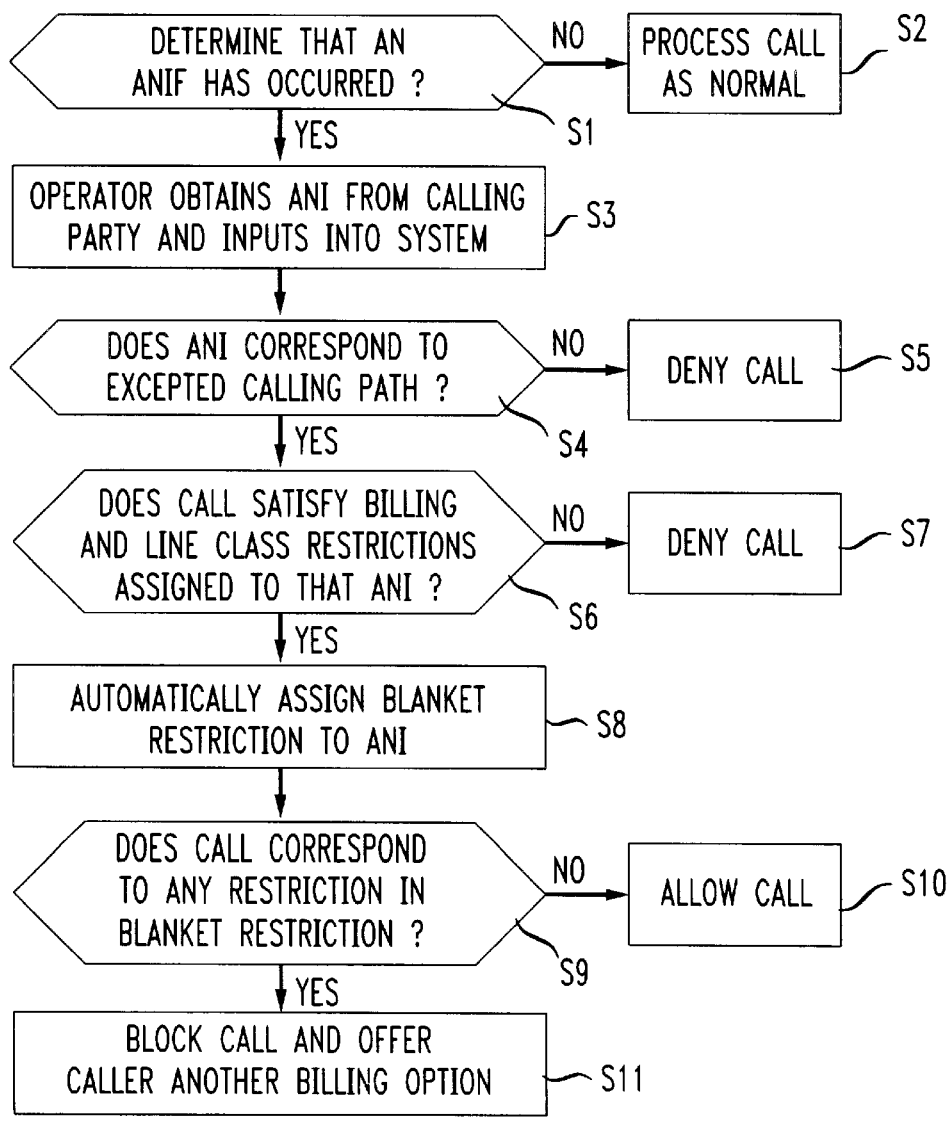
FIG. 2 is a flow chart illustrating various steps according to a preferred embodiment of the present invention.

With reference to FIGS. 1 & 2, to access the IXC network, the call (including billing information such as the ANI) is routed through known gateway switching equipment 3, such as AT&T's 4ESS™ and 5ESS™ toll switches and/or operator services position system (OSPS™) switch. When an ANIF occurs as a result of the failure or interruption in the signalling of the calling number stream, the switch 3 is programmed to interface with an operator 4 in the IXC network (step S1). The operator 4 communicates with the party calling from telephone 1 (calling party), obtains information equivalent to the ANI from the calling party (customer-provided ANI) and transmits that information to the switch 3 for processing (step S3).

Based upon the customer-provided ANI, the switch 3 (or an adjunct in communication with the switch) processes customer-provided ANI during an initial inquiry to verify that the actual calling path from which the call was routed corresponds to the calling path expected for a call having that particular ANI (step S4). This is accomplished by comparing the customer-provided ANI to a list of line numbers served by the incoming trunk group which are stored in a database of the switch 3 (or within an adjunct in communication therewith). If the line number corresponding to the customer-provided ANI does not appear on the list, then the call is identified as potentially fraudulent and is denied (step S5).

If the line number corresponding to the customer-provided ANI falls within the range of line numbers stored in switch 3 (or an adjunct in communication therewith) (step S4), then the call is further processed via OLS 5 and/or NAI 6. During OLS 5 and NAI 6, the customer-provided ANI is checked against tables containing any billing and line class restrictions associated with the particular ANI which may be stored in a database of the OLS 5 and/or NAI 6 (step S6). If the call does not satisfy the billing and line class restrictions, then the call is identified as potentially fraudulent and is denied (step S7). Alternatively, if the call satisfies the billing and line class restrictions associated with the ANI (step S6), then the call continues to be processed by the switch 3 (or an adjunct in communication therewith).

After the call having the ANIF passes OLS 5 and/or NAI 6, the switch 3 (or an adjunct in communication therewith) automatically assigns an IXC-defined blanket restriction against the customer-provided ANI (step S8). This IXC-defined blanket restriction instructs the switch 3 to only allow specific call types and to block other restricted call types. The specific call types to be allowed under the blanket restriction would typically be alternative billing methods (such as collect or credit card calls) which are deemed a safer risk than station-paid calls (e.g., calls billed to the ANI of the calling party).

The IXC-defined blanket restriction may include, but are not limited to, restrictions of the following call types:
Station-paid
Auto-collect (1+800 calls)
Collect to called number
Collect to a number other than the called number
Credit card to calling party
Credit card to third party
Bill to third party by the calling party
Bill to third party by the called party
International calls A call which does not correspond to one of the restricted call types in the IXC-defined blanket restriction will be allowed (step S10). To minimize the number of fraudulent calls occurring in conjunction with an ANIF, however, the switch 3 will automatically block the call if the call corresponds to one of the IXC-defined call types in the blanket restriction (i.e., station paid calls). A voice message will then be communicated to the calling party requesting that the calling party select an alternative billing method (i.e., collect or credit card) which would be permitted under the blanket restriction (step S11). If the calling party provided the information necessary for a permissible alternative billing methods, then the call would be processed as normal in accordance with the conventional procedures for that type of billing method. However, if the calling party refused to select an alternative billing method permissible under the blanket restriction, then the call would be denied.

To minimize any inconvenience to law abiding subscribers, a non-restrictive screen code may be assigned to such a subscriber whose calls have been repeatedly blocked due to the blanket restriction. That is, the assignment of a blanket restriction to a particular subscriber may be disabled by providing a non-restrictive screen code to the subscriber's ANI. This non-restrictive screen code may be stored in the switch 3 (or in an adjunct in communication therewith) and would prevent the automatic assignment of a blanket restriction by the switch 3 (or by an adjunct in communication therewith) when an ANIF occurs.

Furthermore, because equipment problems may temporarily create an ANIF (e.g., equipment induced ANIF), the assignment of a blanket restriction by the switch 3 (or by an adjunct in communication therewith) may be selectively disabled for those ANIs in the particular trunk group identified as having temporary equipment induced ANIFs. Such geographic disablement of the blanket restriction may be accomplished by setting the particular end office(s) 2 associated with the trunk group having equipment-induced ANIFs to override the blanket restrictions. Alternatively, the switch 3 (or an adjunct in communication therewith) may be set to disable the automatic assignment of a blanket restriction to any call having an ANIF which is transmitted from a particular end office 2 associated with a trunk group having equipment-induced ANIFs.

Moreover, where particular end office(s) 2 or trunk groups are known to have high levels of customer-induced (fraudulent) ANIFs, the switch 3 (or an adjunct in communication therewith) may automatically assign the blanket restriction to any call having an ANIF which is transmitted from that particular end office 2.

Although an illustrative preferred embodiment has been described herein in detail, it should be noted and will be appreciated by those skilled in the art that numerous variations may be made within the scope of this invention without departing from the principle of this invention and without sacrificing its chief advantages. The terms and expressions have been used herein as terms of description and not terms of limitation. There is no intention to use the terms or expressions to exclude any equivalents of features shown and described or portions thereof and this invention should be defined in accordance with the claims which follow.

We claim:

1. A fraud control method for processing a call placed by a calling party within a telecommunications network, said call having an automatic number identification failure (ANIF), comprising the steps of:

obtaining information equivalent to an automatic number identification (ANI) associated with said call;

determining whether said call is of a restricted type corresponding to network restrictions associated with said ANI; and automatically assigning a billing restriction to said call if said call is not of said restricted type.

2. The fraud control method according to claim 1, further comprising the steps of:

obtaining said information equivalent to the ANI associated with said call from said calling party through a network operator; and communicating said obtained information to a switch responsible for processing said call.

3. The fraud control method according to claim 1, further comprising the step of blocking said call if said call is of a type restricted by said assigned billing restriction.

4. The fraud control method according to claim 1, further comprising the step of allowing said call to be completed if said call is not of a type restricted by said assigned billing restriction.

5. The fraud control method according to claim 1, further comprising the step of allowing said call to be completed when said calling party selects an alternative billing method which is not restricted by said assigned billing restriction.

6. The fraud control method according to claim 1, wherein said assigned billing restriction is defined by a network carrier.

7. The fraud control method according to claim 1, wherein the step of determining whether said call is of a restricted type corresponding to network restrictions associated with said ANI, comprises the steps of:

storing a list of line numbers served by the incoming trunk group to said switch;

comparing said obtained information equivalent to said ANI associated with said call to said stored list of line numbers; and identifying the call as potentially fraudulent when said obtained information fails to match one of said line numbers within said stored list.

8. The fraud control method according to claim 1, further comprising the step of selectively disabling said assigned billing restriction.

9. The fraud control method according to claim 8, wherein said assigned billing restriction may be selectively disabled for a particular caller by storing a non-restrictive screen code associated with said caller in said switch.

10. The fraud control method according to claim 8, wherein said assigned billing restriction may be selectively disabled for any caller within a particular trunk group.

11. A fraud control system for processing a call placed by a calling party within a telecommunications network, said call having an automatic number Identification failure (ANIF), comprising:

a switch located within said network for processing said call and receiving information equivalent to an automatic number identification (ANI) associated with said call, said switch determining whether said call is of a restricted type based upon said received information, and said switch automatically assigning a billing restriction to said call if said call is not of said restricted type.

12. The fraud control system according to claim 11, further comprising a network operator in communication with said switch and said calling party, wherein said network operator is capable of obtaining information associated with said call from said calling party and communicating such obtained information to said switch.

13. The fraud control system according to claim 11, wherein said switch blocks said call if said call is of a type restricted in said assigned billing restriction.

14. The fraud control system according to claim 11, wherein said switch allows said call to be completed if said call is not of a type restricted in said assigned billing restriction.

15. The fraud control system according to claim 11, wherein the switch allows said call to be completed when said calling party selects an alternative billing method which is not restricted by said assigned billing restriction.

16. The fraud control system according to claim 12, wherein said information obtained from said calling party is equivalent to an automatic number identification (ANI) that would have been provided had said ANIF not occurred.

17. The fraud control system according to claim 16, wherein a list of line numbers served by the incoming trunk group to said switch is stored in a database of said switch, said switch capable of comparing said obtained information associated with said call to said stored list of line numbers, and wherein said call is identified as potentially fraudulent when said obtained information fails to match one of said line numbers within said stored list.

18. The fraud control system according to claim 11, wherein said assigned billing restriction is defined by a network carrier.

19. The fraud control system according to claim 11, wherein said assigned billing restriction may be selectively disabled.

20. The fraud control system according to claim 19, wherein said assigned billing restriction may be selectively disabled for a particular caller by storing a non-restrictive screen code associated with said caller in said switch.

21. The fraud control system according to claim 19, wherein said assigned billing restriction may be selectively disabled for any caller within a particular trunk group.

* * * * *